(12) United States Patent
Bertram

(10) Patent No.: US 6,673,193 B1
(45) Date of Patent: Jan. 6, 2004

(54) SYSTEM AND METHOD FOR WELDING A SEAM BETWEEN THERMOPLASTIC LINER SHEETS

(75) Inventor: Richard L. Bertram, Malibu, CA (US)

(73) Assignee: Linabond Inc.

( * ) Notice: Subject to any disclaimer, the term of this patent is extended or adjusted under 35 U.S.C. 154(b) by 0 days.

(21) Appl. No.: 09/213,671

(22) Filed: Dec. 17, 1998

(51) Int. Cl.⁷ .................................... C09J 5/04

(52) U.S. Cl. .................... 156/315; 156/310; 156/304.3; 525/239

(58) Field of Search .................. 428/420; 156/310, 156/315, 304.3; 525/239

(56) References Cited

U.S. PATENT DOCUMENTS

| | | | |
|---|---|---|---|
| 1,560,346 A * | 11/1925 | Fuller | 156/64 |
| 2,388,297 A | 11/1945 | Slaughter | |
| 3,197,350 A * | 7/1965 | Wedger et al. | 156/64 |
| 3,198,692 A | 8/1965 | Bridgeford | |
| 3,625,259 A | 12/1971 | Kennedy, Jr. | |
| 3,742,985 A | 7/1973 | Rubenstein | |
| 4,112,176 A | 9/1978 | Bailey | |
| 4,296,156 A | 10/1981 | Lustig et al. | |
| 4,307,000 A | 12/1981 | Vasta | |
| 4,361,626 A * | 11/1982 | Boba et al. | 428/420 |
| 4,460,747 A * | 7/1984 | Horak et al. | 525/239 |
| 4,585,371 A | 4/1986 | Jones-Hinton | |
| 4,590,218 A | 5/1986 | Vass | |
| 4,602,974 A | 7/1986 | Wood et al. | |
| 4,728,223 A | 3/1988 | Rice | |
| 4,732,632 A | 3/1988 | Pieslak et al. | |
| 4,792,493 A | 12/1988 | Bertram et al. | |
| 5,017,258 A | 5/1991 | Brown et al. | |
| 5,087,514 A * | 2/1992 | Graefe | 428/420 |
| 5,190,705 A | 3/1993 | Corazza | |
| H1163 H | 4/1993 | Bone | |
| 5,241,993 A | 9/1993 | Stephens | |
| 5,268,392 A | 12/1993 | Bertram | |
| 5,279,882 A * | 1/1994 | Daude et al. | 428/420 |
| 5,357,005 A | 10/1994 | Buchwalter et al. | |
| 5,389,692 A | 2/1995 | Bertram | |
| 5,458,155 A | 10/1995 | Stephens | |
| 6,074,755 A * | 6/2000 | Rasmussen et al. | 156/310 |

FOREIGN PATENT DOCUMENTS

| | | | |
|---|---|---|---|
| DE | 29 12 479 | 10/1980 | |
| DE | 29 39 678 A1 | 3/1982 | |
| EP | 0356886 * | 3/1990 | |
| EP | 0 475 769 A1 | 3/1992 | |
| EP | 0 750 648 A | 1/1997 | |
| FR | 1591995 | 6/1970 | |
| GB | 1 281 823 A | 7/1972 | |
| GB | 2 123 919 A | 2/1984 | |
| JP | 54-133575 | 10/1979 | |
| JP | 55-103995 | 8/1980 | |
| SU | 883132 * | 11/1981 | 156/315 |

OTHER PUBLICATIONS

"UCAR Solution Vinyl Resings for Coatings" Title page, Contents page, pp. 1–36, Union Carbide Corporation, Danbury, Connecticut.

* cited by examiner

Primary Examiner—Jeff H. Aftergut
Assistant Examiner—John L. Goff
(74) Attorney, Agent, or Firm—Hall, Priddy, Myers & Vande Sande

(57) ABSTRACT

Sheets of thermoplastic material for lining structural containers and conduits, and having portions of their surfaces at the edges to be joined to each other treated with urethane, are joined and sealed by a strip of polyvinyl chloride, the interacting surface of which is prepared by hydroxyl modification for sealing with the thermoplastic sheets. The joinder is accomplished by a method that dispenses with any necessity of specially treating the surfaces at any prescribed time prior to accomplishing the joinder, and dispenses with any requirement for heat elevation during joinder. A method of joinder with the thermoplastic sheets alone is also shown.

24 Claims, 2 Drawing Sheets

SYSTEM AND METHOD FOR WELDING A SEAM BETWEEN THERMOPLASTIC LINER SHEETS

BACKGROUND OF THE INVENTION

1. Field of the Invention

This invention relates generally to the art of coating and lining fluid containers and conduits, and more particularly concerns systems and methods for chemically joining and sealing coatings and linings together for the purpose of coating and lining fluid containers and conduits.

2. Description of Related Art

Waste water and sewerage are frequently conducted through fluids conduits made of concrete. In some applications, the conduits are made of metal. Sewer systems frequently have reservoirs, containers and ponds, such as settling ponds which also are made of concrete and sometimes metal. Sewerage and waste water often contain material that is highly corrosive, especially with respect to concrete and metal. The closed systems that constitute most sewerage systems in use presently create anaerobic conditions ideal for the proliferation of anaerobic bacteria that result in hydrogen sulfide. Consequently, waste water pipes, sewage pipes, reservoirs, containers and ponds frequently are the subject of substantial corrosion and deterioration. The addition, corrosive material resulting from the digestive by-products of organisms existing within the waste water and sewer systems cause substantial deterioration of the concrete and metal conduits.

As used herein, the terms "conduits" and "pipes," are intended to include not only conduits and pipes, but also box tunnels and culverts, reservoirs, containers and ponds as discussed above. Such "conduits" and "pipes," as those terms are used herein, can include, for example, settling or processing "ponds" at sewage processing plants, back-up reservoirs and, in general, building structures involved with such processing.

The deterioration that occurs in such conduits and pipes frequently takes the form of physical decay of the walls of the conduits and pipes, so that the thickness of the walls is reduced. Significant amounts of the concrete or metal can be removed or corroded away over the years. In many instances, sewer and waste water conduits and like structures have walls so thin that the conduits have collapsed under the weight of traffic passing over them, and it has been reported that people have stuck their arms through them with relative ease.

Another undesirable effect of the corrosion and deterioration is that in the weakened condition that thin walls have, the walls crack more easily, resulting in leaks in the sewer system. Such leaks undermine the soil or prepared beds surrounding the concrete or metal pipes. Further, such leaks may contaminate the aquifer, pollute the waterways, and come to the surface to make the environment above unpleasant, as well.

Some of the more common corrosive materials within sewer conduits are sulfuric acid and hydrogen sulfide, which can turn into sulfuric acid under the conditions frequently found in sewer systems. Their corrosive effects may be readily appreciated. Sewer conduits normally have an anaerobic slime deposit along the wall of the conduit which is submerged below the liquid line or level. Various metal sulfates are among the more common ingredients of this anaerobic deposit. In the substantially liquid waste water, the sulfates reduce to sulfide ions, which combine with the hydrogen in the waste water to outgas above the liquid level as hydrogen sulfide.

Hydrogen sulfide, per se, can be highly corrosive to metals, of which some sewer pipes are made. Many concrete pipes have metal, as, for example, steel reinforcing ribs, beams and like support structures, which are sometimes called "rebar."

Oxygen from the air intakes in the sewer system, such as manholes, as well as oxygen from water condensing on the upper portions of the interior surfaces of the conduit wall which are not in contact with the liquid being conducted, interacts with bacteria within the conduit above the liquid level. The bacteria above the liquid level thus produces more hydrogen sulfide. Oxygen from the liquid and condensing from the water in the air reacts with the hydrogen sulfide gas to create highly corrosive sulfuric acid. The acid reacts with the calcium hydroxide in the cement of the concrete conduit, producing gypsum or calcium sulfate, which has been described as a soft corrosion product. The gypsum drops off the interior of the wall itself, making the wall thinner and substantially weakened. In this manner, whole chucks of the concrete wall are removed or vanish, reducing the thickness and strength of the wall.

Restoring such damaged and weakened conduits and pipes in the past has been accomplished primarily through two fundamental methods. In one basic modality, the concrete conduits are entered and fresh concrete is troweled or applied onto the walls to build the thickness back to the original dimension. This method is somewhat problematic in that applying concrete on the roof of the conduit requires special efforts and time. Frequently, such as in sewer conduits, for example, the repair must be performed within a specified time window. Usually, sewer conduits have a relatively lower flow rate or level during the hours between midnight and the normal waking hours of around seven in the morning. After the normal waking hours, most sewer conduits are so full that entry into the conduit and any repair are not possible.

A second modality involves a process of digging from the top surface down to the weakened conduit. The earth around the weakened conduit is excavated, and a layer of concrete of suitable thickness is poured around the weakened conduit to, in effect, provide a new conduit encasing the old, crumbling sewer pipe. This method has special problems, as well. For example, most such pipes are underneath roadways and streets. Excavating down to the sewer pipe requires removing the surface road or street and diverting traffic often for weeks at a time. The amount of concrete required to encase the old pipe is substantial. The manpower required for excavating, concrete pouring and road and street restoration is substantial, as well. Both in time and material, such repair or restoration is expensive, and the disruption to street traffic is costly to the public.

Other modalities exist, such as for example a method called "slip lining," in which new pipe is inserted within the old, crumbling pipe to strengthen the pipe walls. Such methods reduce the diameter of the pipe or conduit and create problems with connecting lateral pipes joined to the pipe being repaired or restored.

Many of the methods used in the past result in a restored conduit which has a surface facing the effluent made of the same material that deteriorated before. This problem has been addressed by coating or lining the interior facing surfaces after restoration of the conduit, but such liners or coating have met with only varying levels of satisfaction.

In the past, many such coating have been made of material in which small pin holes develop, through which the corrosive substance seeps to corrode the concrete so coated "behind" the lining or coating. The corrosion taking place behind the liner or coating not only deteriorates the concrete or metal conduit itself, and the lining or coating breaks loose from the conduit to add to the clogging within the conduit.

It has been known in the past to provide lining for the interior surfaces of such conduits and pipes. See, for example, U.S. Pat. No. 4,792,493 issued to Vernie L. Belcher and myself, and U.S. Pat. No. 5,268,392 issued to myself. Such linings greatly enhance the ability of the conduit to resist the corrosive effects of the many acids, caustics, toxins and organic material common in waste water and sewer systems.

In many situations, however, liners are applied to the interior of concrete pipe sections prior to inserting in the ground and connecting with other pipe sections to form the conduit. In one conventional technology, the liners are provided in sheets, and can be secured to the concrete by ribs having a "T" cross-section embedded in the concrete. Such sheets are normally in widths of approximately four feet. Multiple sheets are welded together to line specified lengths of concrete pipe, with adjacent sheets defining seams where the weld occurs.

The sheets sections, or as used herein simply "sheets", require a joinder of serially adjacent sections at their joining edges. In the past, such joinder has been accomplished by a thin strip of PVC approximately one inch wide applied to cover the seam and over the two abutting edges from the adjoining sheets. Such strips are normally inserted at the rate of 180 lineal feet per man-day.

The seal of the joint between adjoining thermoplastic sheets inside sewer conduit, or even in a container is important because of the corrosive substances that likely will be contained or conducted within them. Should the seal fail and the corrosive substances seep behind the seal, through the space between the adjacent thermoplastic sheets to the grouting or other material, and even the concrete or metal behind the thermoplastic liners themselves, the underlying conduit or container is jeopardized.

Many such seals in the past have been accomplished by a heat seal method. Normal temperature in underground sewers usually range from 40 to 65 degrees Fahrenheit. The temperatures vary little over the seasons of the year because of the subterranean location of the conduits. In the heat seal method, the PVC strip is typically heated to some elevated temperature to fuse or heat seal the strip to the adjoining thermoplastic sheets, which themselves are PVC. Elevating the temperature of the PVC necessarily occurs when the sealing strip is heat sealed onto the PVC sheets. Raising the temperature as occurs in the heat sealing or fusing process can damage the PVC, i.e. dry out the PVC, causing the surface to crack and sometimes to shrink. Such sealing or fusing processes can tend to oxidize and decompose the PVC. Failure to raise the temperature of the materials sufficiently, however, can result in failure of the heat seal bond. In addition, frequently in the application of such heat seal welds, the installation process can be rushed, resulting in application of heat for an insufficient period of time to yield adequate bonding, resulting in subsequent bonding failures.

PVC contains plasticizers that can migrate in the heat sealing or fusing processes, changing some basic properties of the PVC. If the plasticizers migrate to the surface portions to which the sealing strip is to be joined, a joining surface having a higher concentrations of plasticizer will tend to make the surface not stick, or less capable of holding any surface joined to it.

Referring to FIGS. 1 to 3, illustrating a prior art seam sealing technique, a sewer conduit 10 is typically comprised of a cylindrical concrete pipe 12. Often, the concrete 12 is reinforced by steel rebar. A PVC sheet 14 lines the interior of the concrete pipe 12. The sheet 14 shown is of the "T" construction, having a series of parallel ribs 16 extending perpendicularly from a surface of the sheet 14, each rib ending in a perpendicular cross-rib to result in a "T" shaped cross-section. The sheet 14 is normally placed in position on the concrete form prior to pouring the concrete pipe into the form. When the pipe is removed from the form, the sheet 14 will be formed with the pipe 12. In some situations in repairing installed conduits, a liner 14 can be positioned within the pipe either as a form or supported by a form. Grout is then inserted behind the liner to fill the space between the liner and the concrete pipe to embed the "T" ribs.

The "T" shaped ribs 16 of the PVC sheet 14 are embedded into the concrete pipe 12. As shown, a first, single sheet 20 is defined by a width indicated by the dimension 22 and has a longitudinal dimension sufficient to extend around the interior circumference of the concrete pipe 12. As shown, the sheet 20 has an edge 24, shown in broken line in FIG. 1, to be joined to an adjacent edge 26, also shown in broken line FIG. 1, of a second sheet 28 having a width 30 and positioned seriatim next in the length of the concrete pipe 12 along the direction of the flow of the fluid, indicated by the flow arrow 32. In a conduit thousands of feet, or even several miles in length, many of such sheets 12 must be installed. Each of such sheets 20, 28 must be joined at their seams in such manner that prevents seepage between the joinder.

As may be better seen in FIGS. 2 and 3, a PVC strip 36 is positioned over and covers the adjoining edges 24, 26 to protect them from the substances flowing in the direction of the arrow 32 in the conduit 10. The PVC strip 36 usually is on the order of one inch in width. In the past, the strip has been heat fused onto the top surfaces of the abutting sheets 20, 28, covering the seam of the edges 24, 26. Hereinafter in this description, the term "top" will be used to denote the surface facing the interior of the conduit 10; that is, facing the interior which conducts the fluid flowing 32 within the conduit or, in the case of the container, facing the fluid contained therein. Such a heat fusion required that a strong elevation of temperature be applied to the strip 36, which was sufficient to elevate the temperature of the covered sheets 20, 28 at least at the portions being covered by the strip 36. Further, the heat had to be applied for specified periods of time, depending on the ambient temperature and humidity conditions. Frequently, the seal obtained for such a prior art seam was insufficient, and the seal gave way, cracked, became separated, and the strip 36 became separated from its seam. The corrosive material contained in the conduit 10 seeped through the seam between the edges 24, 26 to attack the concrete pipe 12.

As is illustrated in FIG. 3, a common solution to the breakdown of any seal in the generally circular seams of the liner 14 is to provide a substantially wider additional strip 37 to cover the strip 36 and adjacent portions of the top surfaces of the abutting sheets 20, 28. However, application of such a wider sealing strip requires greater care and time to achieve satisfactory heat bonding, and it has been found that such a seal will eventually also deteriorate in the same manner as the original seal of the heat fused strip 36.

It is thus desired to have a method and a material for sealing thermoplastic sheets lining or coating a conduit, such as sheets made of PVC, that prevent corrosive substances conducted through the conduits from seeping behind the sheets used as liners. It is further desired to provide a method, and material that can be used to accomplish such seals without any elevation in temperature. It is desired to provide such methods and material that will accomplish a seam in a relatively short time and which will relatively simple to accomplish. The present invention meets these and other needs.

SUMMARY OF THE INVENTION

Briefly, and in general terms, the present invention provides for a method for joining thermoplastic sheets to each other at a seam defined by adjacent edges of the sheets, by a chemical weld that is accomplished within a short time, measured in minutes, and at ambient temperatures in sewer environments, that is, at temperatures as low as 40 degrees Fahrenheit or lower. A surface portion extending from the seam comprises polyurethane containing an excess isocyanate component. The seam between the thermoplastic sheets is covered by a strip of polyvinyl chloride having a corresponding facing surface portion that contains a resin with available hydroxyl groups for chemical covalent bonding with the surface portions of the thermoplastic sheets adjacent to the seam. The strip is smoothed to expel entrapped gas, if any. In another presently preferred embodiment, the seal can also be accomplished by preparation of a surface portion of a first thermoplastic sheet extending from the first thermoplastic sheet, and preparation of a surface portion of a second thermoplastic sheet extending from a corresponding mating edge of the second thermoplastic sheet, and then by overlapping the prepared mating surface portions of the first and second thermoplastic sheets, to define a seam by overlapping the edges of the two sheets. In this manner, the additional polyvinyl chloride strip can be eliminated. All of the sealing is accomplished at ambient temperature within a relatively short period of time.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
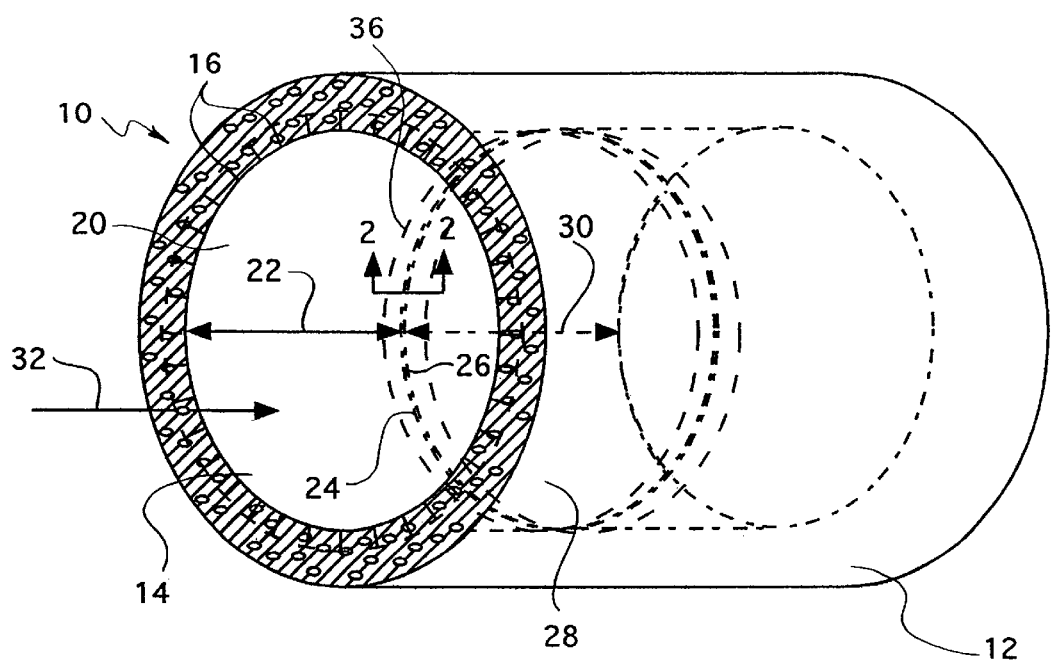
FIG. 1 is perspective view of a conduit illustrating a prior art conduit seam welding technique.
Figure 2:
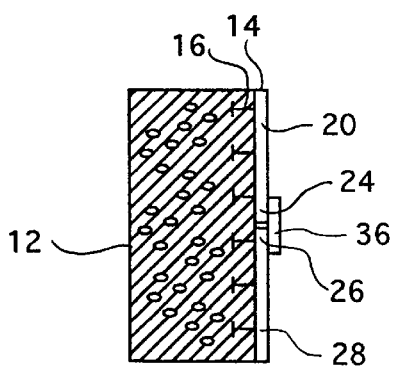
FIG. 2 is a cross-sectional view of the conduit taken along line 2—2 of FIG. 1.

Waste water and sewerage are frequently conducted through fluids conduits made of concrete. In some applications, the conduits are made of metal. Sewer systems frequently have reservoirs, containers and ponds, such as settling ponds which also are made of concrete and sometimes metal. Sewerage and waste water often contain material that is highly corrosive, especially with respect to concrete and metal. The closed systems which constitutes most sewerage systems in use presently, creates anaerobic conditions ideal for the proliferation of anaerobic bacteria which result in hydrogen sulfide. Consequently, waste water pipes, sewage pipes, reservoirs, containers and ponds frequently are the subject of substantial corrosion and deterioration. The addition, corrosive material resulting from the digestive by-products of organisms existing within the waste water and sewer systems cause substantial deterioration of the concrete and metal conduits.

While restoration of deteriorated conduits has typically been accomplished by application of fresh concrete from the interior or exterior, or inserting a new conduit within the old conduit to essentially rebuild the conduit, these methods have been problematic in practice, and usually result in a restored conduit as vulnerable to degradation as before the repair. Attempts at coating or lining the interior of the conduit to prevent further degradation have met with varying success, since pin holes, breaks or discontinuities of the coating or lining can permit further deterioration of the repaired conduit, and attempts to heat seal adjoining liner sheets can damage the liner and seal incompletely.

As is illustrated in the drawings, the invention is accordingly embodied in a method for sealing a thermoplastic liner, such as a polyvinyl chloride (PVC) liner for a sewer conduit. Referring to FIG. 4, in one currently preferred embodiment of the method of the invention, a PVC strip 38, approximately three inches wide can be used to cover the prior art strip 36 illustrated in FIG. 3, which can have various configurations such as interlinking and interlocking configurations as well, and approximately one inch each on the adjacent top surfaces of sheets 20 and 28. The bottom surface 40 of the PVC strip 38 and the top surfaces of the sheets 20 and 28 are preferably treated to contain a resin with hydroxyl groups available for bonding to covalently bond the strip 38 to the top surfaces of the thermoplastic sheets 20, 28. It has been found that where the thermoplastic sheets 20, 28 are treated to result in a portion extending away from the edges 24, 26, or away from the edges of the strip 36 having polyurethane layers 39 comprising an excess isocyanate component in its composition, such as by spraying, painting, or laminating uncured polyurethane on the thermoplastic and allowing the polyurethane to at least partially cure, a fluid seal can be obtained at ambient temperatures as low as 40 degrees Fahrenheit with a PVC strip 38 having its bottom surface painted with a solution containing the resin having free hydroxyl groups. In a preferred embodiment, the uncured polyurethane applied has sufficient body or viscosity to form an effective seal. The polyurethane utilized in the method of the present invention preferably has a free isocyanate index of approximately 1.03, providing approximately 3 percent isocyanate groups available for covalent bonding with free hydroxyl groups to provide an effective covalent bond. The resin with free hydroxyl groups, also referred to as a hydroxyl resin, is preferably provided in a solvent based activator that can be applied as a solution by spraying or painting, for example, on the thermoplastic or PVC to be treated, with the solvent allowing the hydroxyl resin to penetrate the thermoplastic or PVC, after which the solvent evaporates, leaving the hydroxyl resin in the surface portion of the thermoplastic or PVC available and prepared for bonding with the available isocyanate component in the polyurethane layer. The solvent based activator utilized is currently available from Linabond, Inc. under the trade name "CLA-2." The solvent based activator preferably comprises tetrahydrofuran (THF) and acetone, a dye to identify where the compound has been applied, and a catalyst to facilitate the covalent bonding between hydroxyl resin treated thermoplastic or PVC and the polyurethane layer. The hydroxyl resin generally comprises approximately from about 2% to about 25% of the solution to be applied, and preferably comprises about 5% to about 8% of the solution.

In one presently preferred embodiment the resin with available hydroxyl groups is preferably a vinyl resin hydroxyl compound currently available from Union Carbide under the trade name "VROH." VROH is a low molecular weight terpolymer comprising approximately 81 percent vinyl chloride, a vinyl acetate, and a hydroxyl alkyl acrylate providing a free hydroxyl content of approximately 2 percent. The solvent based activator with which the thermoplastic or PVC are treated comprises, based on approximately 100 parts by weight in total, about 72 parts by weight tetrahydrofuran (THF), about 21.9 parts by weight acetone, about 6 parts by weight VROH vinyl resin hydroxyl compound, about $1.76 \times 10^{-3}$ violet dye, and about 0.09 parts by weight of a catalyst, such as dibutyltin dilaurate, available from Witco, or from Caschem under the trade name "COTIN 200." Alternatively, other catalysts such as stannous tin octoate, zinc octoate, or a tertiary amine may also be suitable for use in the vinyl resin hydroxyl solution applied to the thermoplastic or PVC materials. The PVC strip 38 can be extruded to incorporate the hydroxyl ester solution, and the strip 38 should form the seal demanded in an underground sewer conduit 10.

Figure 3:
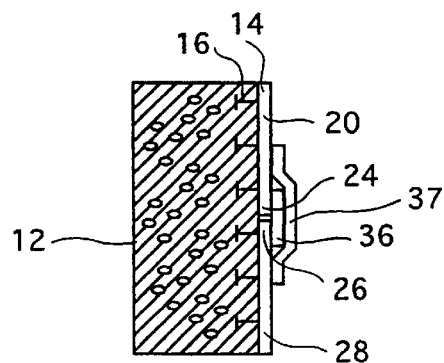
FIG. 3 is an enlarged sectional view of a portion of FIG. 2.
Figure 4:
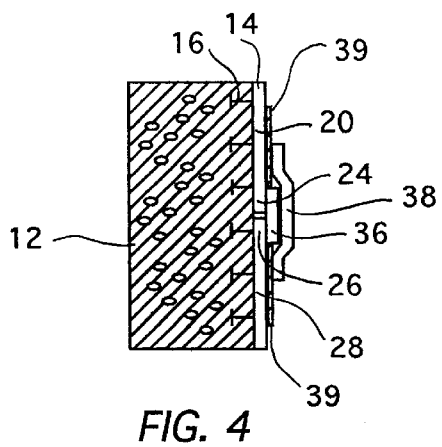
FIG. 4 is cross-sectional view of a seam seal patched according to a first preferred embodiment of the method for welding a seam between thermoplastic liner sheets according to the present invention.
Figure 5:
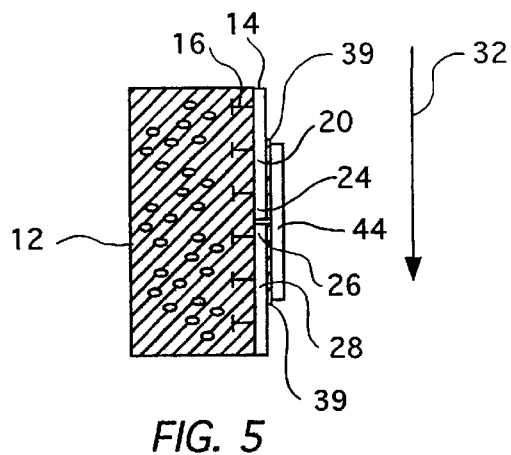
FIG. 5 is a cross-sectional view illustrating a second preferred embodiment of the method for welding a seam between thermoplastic liner sheets according to the present invention.

Turning to FIG. 5, in a second preferred embodiment of the method of the invention, rather than fixing a failed seal, as suggested in the embodiment described in FIG. 3, a seal may be formed initially with the benefit of the present invention. In FIG. 4, a brief section of a cross-sectional view of the concrete pipe 12 is shown having the "T" ribs 16 of the sheets 20, 28 embedded into it. The top surfaces of the sheets for a portion extending away from their respective edges 24, 26 are treated to contain a resin with free hydroxyl groups as described above, and to have a layer of polyurethane 39 such as by spraying, painting, or laminating uncured polyurethane on the sheets, comprising an excess isocyanate component, and allowing the polyurethane to at least partially cure. A PVC sealing strip 44 is treated to contain a resin with free hydroxyl groups as described hereinabove in connection with FIG. 4, at least on the bottom surface of the strip 44. In this description, the term "bottom" with respect to surfaces is used to mean the surface facing away from the fluid being conducted in the conduit 10. The strip 44, having a width of approximately three inches, is then applied to the seam defined by the abutting sheets 20, 28 at ambient temperature for a brief period of time, typically about an hour, to accomplish a seal. The flow of fluid is indicated by the arrow 32.

Figure 6:
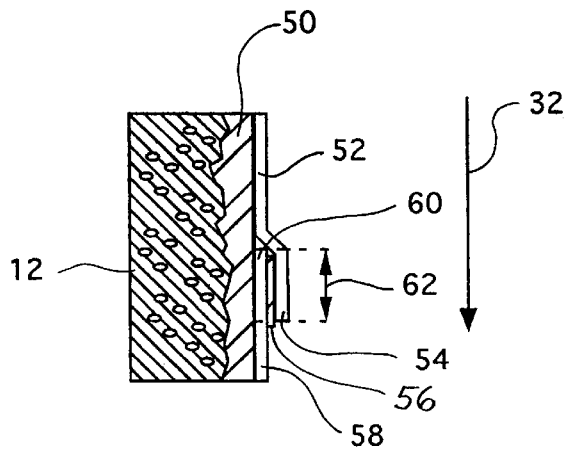
FIG. 6 is cross-sectional view illustrating a third preferred embodiment of the method for welding a seam between thermoplastic liner sheets according to the present invention; and, FIG. 7 is a cross-sectional view illustrating a fourth preferred embodiment of the method for welding a seam between thermoplastic liner sheets according to the present invention.

In FIG. 6, in which the direction of the flow of the fluid is indicated by the arrow 32, another embodiment is shown in which the same degree of seal can be accomplished. In this embodiment, the concrete pipe 12 is first covered with a layer of polyurethane 50, which preferably contains an excess isocyanate component. The bottom surface of a first PVC sheet 52 adjacent to its edge 54 and the top surface of a second PVC sheet 58 adjacent to its edge 60 are treated to contain a resin having available hydroxyl groups along their respective lengths 62 as described above. The first PVC sheet 52 is shown overlapping the edge 60 of the second PVC sheet 58 by the length 62. A polyurethane layer 56 comprising an excess isocyanate component is placed between the overlapping sheets 52, 58 and the treated surfaces interact with the polyurethane layer 56 to chemically covalently bond the first PVC sheet, the polyurethane layer 56, and the second PVC layer at ambient temperatures. Entrapped gas may be expelled by smoothing the joinder.

Figure 7:
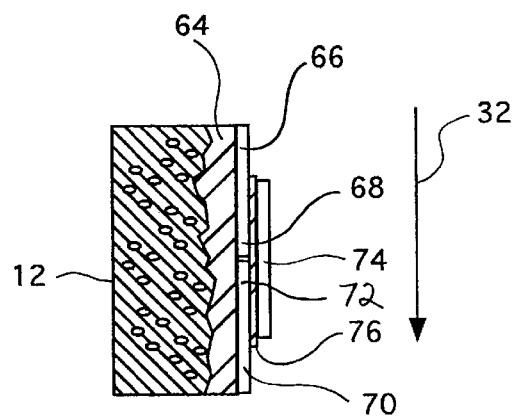

In FIG. 7, in which the fluid flows in the direction of the arrow 32, yet another embodiment is shown for accomplishing the desired seal. The concrete pipe 12 is lined with a layer of polyurethane 64, which preferably contains an excess isocyanate component. A first PVC sheet 66 having an edge 68 is treated to contain a resin with free hydroxyl groups as described above, and adhered to the polyurethane layer 64. A second PVC sheet 70 having an edge 72 is adhered to the polyurethane layer 64, with the edge of the second PVC sheet adjacent to the edge of the first PVC sheet. The seam between the first and the second sheets 66, 70 is then covered by a PVC sealing strip 74.

The bottom of the PVC strip 74 is preferably extruded with the hydroxyl resin in the solvent based activator as described hereinabove. The top edge surface portions of the PVC sheets are treated with a thin layer of polyurethane 76 having an excess isocyanate component. The PVC sealing strip 74 is pressed over the seam to cover the seam between the edges 68, 72 of the PVC sheets 66, 70, and to cover the portions of the top surfaces of the PVC sheets 66, 70 extending from the edges 68, 72. The strip 74 is smoothed to free any gas entrapped between the bottom surface of the strip 74 and the adjoined top surfaces of the sheets 66, 70. The bottom surface of the PVC sealing strip 74 adheres to the treated top surfaces of the sheets 66, 70 at ambient temperatures as low as approximately 40 degrees Fahrenheit or lower.

In each of the foregoing methods described, the PVC sheets can be extruded having the hydroxyl resin compounded or mixed within the composition. Alternatively, the PVC sheets can have the portions of their surfaces that will contact other sheets or strips treated to comprise such an hydroxyl resin modification. In each circumstance, where the PVC sheet or strip is to be sealed or joined to a thermoplastic, the surface of the thermoplastic which is to be bonded with the PVC should be treated to contain a resin with free hydroxyl groups as described above, and with a layer of polyurethane having an excess isocyanate component in its composition. In addition, it should be understood that the PVC sheets and polyurethane materials can have various shapes and configurations.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A method for bonding polyvinyl chloride to polyurethane, comprising:

a) providing a base polyurethane layer, said base polyurethane layer having an excess isocyanate component in its composition;

b) applying a resin containing free hydroxyl groups to one or more portions of one or more polyvinyl chloride sheets to create treated portions of said one or more polyvinyl chloride sheets, said resin being applied in a solution containing a solvent; and c) bonding said one or more polyvinyl chloride sheets to said base polyurethane layer, said bonding taking place between said treated portions of said one or more polyvinyl chloride sheets and said base polyurethane layer, wherein said solvent is operative to allow said resin to dissolve and become impregnated in said treated portions of said one or more polyvinyl chloride sheets.

2. The method of claim 1, wherein said base polyurethane layer is bonded to concrete.

3. The method of claim 1, wherein said solution is applied by spraying said solution on said one or more polyvinyl chloride sheets.

4. The method of claim 1, wherein said solution is applied by painting said solution on said one or more polyvinyl chloride sheets.

5. The method of claim 1, wherein said resin comprises from 2% to 25% of said solution.

6. The method of claim 1, wherein said resin comprises from 5% to 8% of said solution.

7. The method of claim 1, wherein said solvent includes tetrahydrofuran.

8. The method of claim 1, wherein said solvent includes tetrahydrofuran and acetone.

9. The method of claim 1, wherein said solution includes a dye to permit identification of the treated portions of said one or more polyvinyl chloride sheets.

10. The method of claim 1, wherein said solution includes a catalyst selected from the group consisting of dibutyltin dilaurate, stannous tin octoate, zinc octoate and tertiary amine.

11. The method of claim 1, wherein said solution consists of 72 parts by weight of tetrahydrofuran, 21.9 parts by weight acetone, 6 parts by weight of a vinyl resin hydroxyl compound, $1.76 \times 10^{-3}$ parts by weight of a dye, and 0.09 parts by weight of a catalyst selected from the group consisting of dibutyltin dilaurate, stannous tin octoate, zinc octoate and tertiary amine.

12. The method of claims 1, including the additional steps of:

a) preparing polyvinyl chloride strips of sufficient length and width to cover seams between adjacent ones of said one or more polyvinyl chloride sheets;

b) applying a resin containing free hydroxyl groups to said polyvinyl chloride strips to create treated polyvinyl chloride strips, said resin being applied in a solution containing a solvent;

c) applying a second polyurethane layer to regions of said one or more polyvinyl chloride sheets that are adjacent to said seams to create secondary regions, of said one or more polyvinyl chloride sheets, said second polyurethane layer having an excess isocyanate component in its composition; and d) bonding said treated polyvinyl chloride strips to said secondary regions of said one or more polyvinyl chloride sheets to seal said seams.

13. A method for bonding polyvinyl chloride to polyurethane, comprising:

a) providing a base polyurethane layer, said base polyurethane layer having an excess isocyanate component in its composition;

b) applying a resin containing free hydroxyl groups to one or more portions of one or more polyvinyl chloride sheets to create treated portions of said one or more polyvinyl chloride sheets, said resin being applied in a solution containing a solvent;

c) bonding said one or more polyvinyl chloride sheets to said base polyurethane layer, said bonding taking place between said treated portions of said one or more polyvinyl chloride sheets and said base polyurethane layer;

d) arranging said one or more polyvinyl chloride sheets such that adjacent ones of said one or more polyvinyl chloride sheets are positioned with one polyvinyl chloride sheet overlapping an adjacent polyvinyl chloride sheet to create overlapping regions, and said treated portions of said one or more polyvinyl chloride sheets including said overlapping regions; and e) applying an intermediate polyurethane layer, said intermediate polyurethane layer having an excess isocyanate component in its composition, between said overlapping regions of adjacent ones of said one or more polyvinyl chloride sheets;

wherein said solvent is operative to allow said resin to dissolve and become impregnated in the treated portions of said polyvinyl chloride sheets.

14. The method of claim 13, wherein said base polyurethane layer is bonded to concrete.

15. The method of claim 13, wherein said overlapping regions extend at least 2 inches from an edge of said adjacent ones of said one or more polyvinyl chloride sheets.

16. The method of claim 13, wherein said solution is applied by spraying said solution on said one or more polyvinyl chloride sheets.

17. The method of claim 13, wherein said solution is applied by painting said solution on said one or more polyvinyl chloride sheets.

18. The method of claim 13, wherein said resin comprises from 2% to 25% of said solution.

19. The method of claim 13, wherein said resin comprises from 5% to 8% of said solution.

20. The method of claim 13, wherein said solvent includes tetrahydrofuran.

21. The method of claim 13, wherein said solvent includes tetrahydrofuran and acetone.

22. The method of claim 13, wherein said solution includes a dye to permit identification of the treated portions of said one or more polyvinyl chloride sheets.

23. The method of claim 13, wherein said solution includes a catalyst selected from the group consisting of dibutyltin dilaurate, stannous tin octoate, zinc octoate and tertiary amine.

24. The method of claim 13, wherein said solution consists of 72 parts by weight of tetrahydrofuran, 21.9 parts by weight acetone, 6 parts by weight of a vinyl resin hydroxyl compound, $1.76 \times 10^{-3}$ parts by weight of a dye, and 0.09 parts by weight of a catalyst selected from the group consisting of dibutyltin dilaurate, stannous tin octoate, zinc octoate and tertiary amine.

* * * * *

UNITED STATES PATENT AND TRADEMARK OFFICE
CERTIFICATE OF CORRECTION

PATENT NO. : 6,673,193 B1
DATED : January 6, 2004
INVENTOR(S) : Richard L. Bertram It is certified that error appears in the above-identified patent and that said Letters Patent is hereby corrected as shown below:

Title page,
Item [73], Assignee, delete "Linabond Inc.".

Signed and Sealed this

Sixth Day of September, 2005

JON W. DUDAS
*Director of the United States Patent and Trademark Office*